Nov. 26, 1957 E. W. BAUER 2,814,794
NON-DESTRUCTIVE SENSING OF MAGNETIC CORES
Filed Aug. 17, 1955
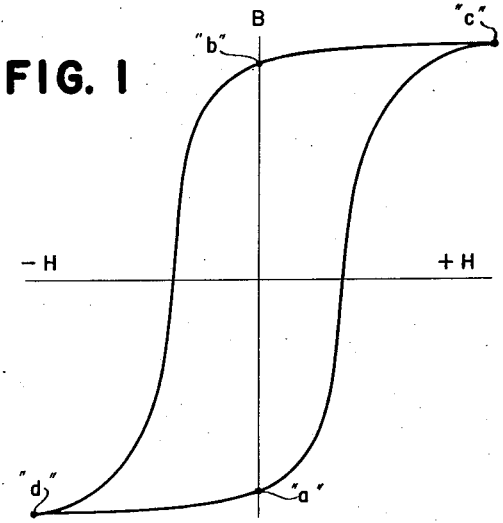
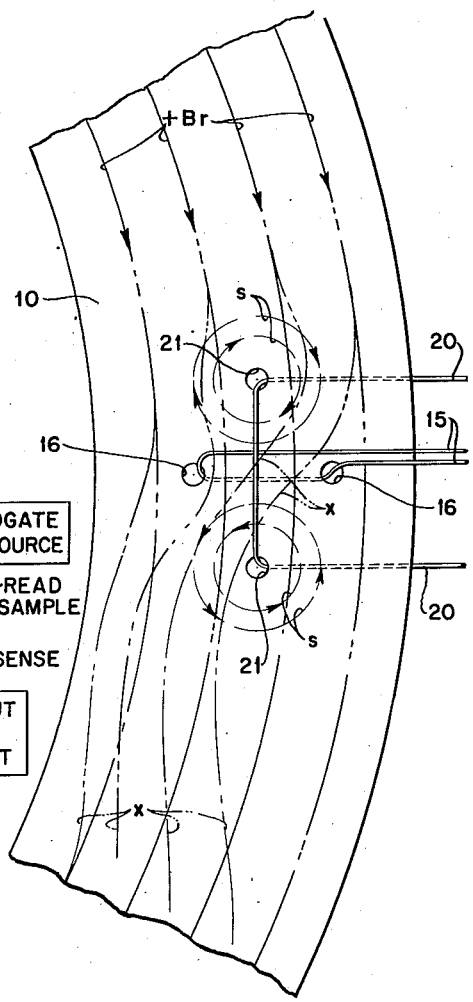
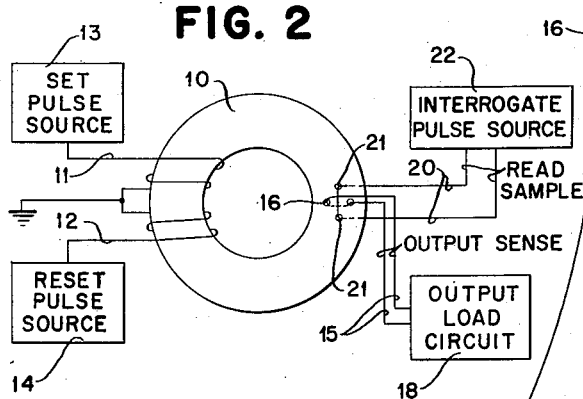
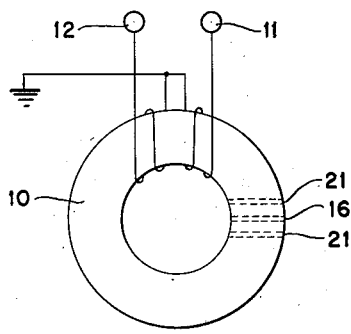
INVENTOR
EDWIN W. BAUER
BY William V. Schelberg
AGENT United States Patent Office 2,814,794
Patented Nov. 26, 1957

2,814,794

NON-DESTRUCTIVE SENSING OF MAGNETIC CORES

Edwin W. Bauer, Poughkeepsie, N. Y., assignor to International Business Machines Corporation, New York, N. Y., a corporation of New York Application August 17, 1955, Serial No. 528,919

5 Claims. (Cl. 340—174)

This invention relates to memory systems wherein binary information is stored as one or the other state of remanence magnetism attained by a core of magnetic material and is directed in particular to an improved arrangement for interrogating such cores without loss of the stored data.

A core of magnetic material exhibiting a high ratio of residual to saturation flux density may be caused to attain one or the other remanence state to represent information by pulsing windings that surround the magnetic circuit. Interrogation conventionally resets the core to a datum state and the information is erased unnecessarily unless the device is to be cleared after each read operation.

Non-destructive sensing of the stored remanence state may be accomplished as described and claimed in the copending application, Serial No. 383,568, filed October 1, 1953, on behalf of E. A. Brown, and it is to an improved arrangement of this character that the present invention is directed. In the application referred to, an auxiliary flux field is produced within the principal magnetic circuit and this field reacts with the remanent magnetic flux in such a manner that a voltage is induced in an output winding embracing the principal flux path, which voltage is indicative of the rememanence state at which the core is set.

In accordance with the present invention the sense winding is positioned to embrace a portion of the core with the amount of residual flux passing through the sense winding increased as the main flux path is diverted by action of the interrogate or sample pulse winding. This structural arrangement provides a signal output of greater magnitude and allows sensing of cores having a more nearly rectangular hysteresis characteristic.

One object of the invention is to provide an improved system for non-destructive sensing of magnetic memory elements.

Another object is to provide an improved arrangement for diverting the remanence flux field in a magnetic core and sensing the direction of the switched flux.

Still another object is to provide an improved structure for switching a flux field in interrogating and controlling a magnetic element without erasure of stored information represented by the flux field.

Other objects of the invention will be pointed out in the following description and claims and illustrated in the accompanying drawings, which disclose, by way of example, the principle of the invention and the best mode, which has been contemplated, of applying that principle.

In the drawings:

Figure 1 is a diagram of the hysteresis loop of a core of magnetic material of the type employed for memory purposes.

Figure 2 is a schematic illustration of one form of the invention as applied to a single magnetic core.

Figure 2a is a detailed view of the core shown in Figure 2.

Figure 3 illustrates another embodiment of the invention.

Magnetic cores fabricated of materials having low coercive force and a high ratio of residual to saturation magnetism, may be placed in either one of two stable states of remanence by means of windings on the core to which pulses are applied. Core material for this purpose may have a somewhat rectangular hysteresis loop such as that illustrated in Fig. 1, however, the invention is not restricted to cores in which the residual flux density is a large fraction of the saturation flux density as shown. Point $a$ on the curve illustrated in this figure, is arbitrarily selected as representing a binary zero and point $b$ then necessarily represents a binary one. With a core initially magnetized in the zero representing remanence state $a$, storage of a binary one is accomplished by pulsing an input winding or windings to produce a magnetomotive force of $+H$ magnitude and cause the core to traverse its hysteresis loop from point $a$ to point $c$, which is the point of magnetic saturation in one direction, and when the pulse terminates, the core transfers to point $b$. Points $a$ and $b$ are stable states as mentioned heretofore, and a core magnetized to either one of these remanence conditions will retain that state without external maintenance energy. With a core in state $a$ initially, storage of a binary zero is accomplished either by failure to apply a magnetomotive force or by application of a force of $-H$. In the latter case, the hysteresis loop is traversed from point $a$ to point $d$ and, on termination of the zero read-in pulse, returns to point $a$.

In interrogating a magnetic element to determine which of the two states $a$ or $b$ are stored, prior art devices apply a read-out pulse of $-H$ to a winding on the core and the voltage induced in a secondary winding is observed. When in a binary one representing state $b$, application of such a magnetomotive force causes the core to traverse its hysteresis loop from point $b$ to point $d$ and, on termination of the force, to point $a$. This change in flux produces a significant output pulse in a secondary winding. With the core in a zero representing state $a$, application of a read-out pulse causes a traversal from point $a$ to point $d$ and return with a negligible flux change taking place and consequently no significant induced pulse produced in the secondary winding. With the core either in a binary zero or binary one representing state, the read-out operation has reset the core to point $a$ and the information previously retained is destroyed.

Referring now to Fig. 2, a bistable magnetic core 10 is illustrated having a plurality of windings. Windings 11 and 12 are set and reset windings, respectively, and are wound about the core 10 in conventional manner. Winding 11 is coupled to a pulse source 13 and functions to cause the core to attain residual state $b$ while winding 12 is coupled to a source 14 and is operable to cause the core to attain state $a$. Obviously these sources and the windings 11 and 12 may be replaced by a single source and winding with pulses of opposite polarity producing such magnetomotive forces as to cause the opposite residual states to be selectively established.

An output circuit is provided by a winding 15 which is threaded through a pair of spaced holes 16 which may be drilled or otherwise formed through the core in a plane normal to the main flux path. While the holes 16 are shown equidistantly spaced from the center line of the core section this position is not limiting to the operation obtained. The output sense winding 15 may comprise one or more turns and is coupled to a load circuit indicated conventionally as a block diagram network 18.

A further winding 20 is likewise threaded through a pair of spaced holes 21 which are formed through the core preferably though not necessarily at its center line and positioned so that the winding 20 embraces a portion of the core material also embraced by the winding 15 but at a right angled relationship thereto. The winding 20 is coupled to a pulse generator 22 designated the interrogate pulse source which may deliver positive energy, negative energy or alternating current as desired.

The openings 16 and 21 as illustrated in Fig. 2 pass through the toroid in a lateral direction, however, they may be positioned radially as shown in Fig. 3 or at other angles provided their relative positions are substantially the same.

Storage of binary information is accomplished in the manner heretofore described by pulsing the winding 11 in a sense so as to cause the core to attain state $b$ in accordance with the arbitrary remanence condition previously selected to represent a binary one. The residual flux direction for this condition of storage is indicated by the dot-dash lines designated $+Br$ in Fig. 2a where a section of the core 10 is shown in greater detail.

To obtain an indication of the residual history of the core the interrogate pulse source 22 is activated and the winding 20 pulsed. Assuming a pulse of one polarity is applied, a flux pattern is considered to be established without the localized region of the core 10 surrounding the holes 21. This flux pattern is designated by the label $s$ and, while the auxiliary flux path actually established is probably more complex than that shown and may include the principal magnetic circuit to some degree as well as the regions surrounding the openings 21, this is considered to be the effective portion and that primarily influencing the path followed by the remanent flux $Br$. When this interrogate flux is applied, the main flux path is diverted at least in part through the sense winding 15 and, even though the total main flux remains substantially the same, the amount passing through the sense winding is increased and this flux change develops an output voltage in this winding. Certain lines of flux are believed to be diverted and seek paths as indicated by the label $x$ in the figure for the pulse polarity described. With the interrogate pulse of reversed polarity, the localized flux path $s$ will have an opposite sense and the main flux $Br$ on the inner radius of the core 10 will be diverted through the winding 15 so that it is obvious that the induced voltage is independent of the interrogate pulse polarity. The magnitude of the output pulses are dependent upon the rate of change of flux and consequently upon the rise and fall time of the sensing current with the residual history of the core distinguished by the relative phase relationships of the induced voltages or, if a suitable waveform of the sensing pulse is chosen, by the polarity of the output voltage. Energization of winding 20 by a controlled pulse shape such as a sawtooth waveform will cause the rate of flux to be greater in either an increasing or decreasing direction, dependent upon the waveform, and the magnitude of the induced voltage in one or the other polarity made negligible by comparison, with the sense of the output dependent only upon the residual flux direction.

It is obvious that the magnetic structure need not be limited to the toroidal shape used for illustration and rectangular or other configurations of the core as well as the openings 11 and 21 are contemplated while employing the features of the invention. The advantages of the arrangement resides in its simplicity and in the manner of switching which causes a greater amount of main flux to affect the output winding and yet allow sensing to occur without substantial alteration of the storage remanence state.

While there have been shown and described and pointed out the fundamental novel features of the invention, as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A storage element comprising a magnetic circuit capable of assuming one or the other stable state of remanence, at least one input winding positioned about said magnetic circuit and adapted to be pulsed to place said circuit in one or the other of said remanence states, a first pair of spaced openings positioned through said magnetic circuit and spanning the center line of the core, a second pair of spaced openings positioned through said magnetic circuit on the center line thereof and intermediate said first pair of openings, an output coil wound through said first pair of openings, an interrogate coil wound through said second pair of openings and adapted to be pulsed intermittently to cause a voltage to be induced in said output winding which voltage is indicative of the remanence state of said storage element.

2. An information storage device comprising a magnetic circuit capable of assuming one or the other of two stable states of magnetization, means for placing said magnetic circuit in one or the other of said stable states, an output winding positioned about a transverse portion only of said magnetic circuit, an interrogate winding positioned about said portion and substantially at right angles with said output winding, and means for energizing said interrogate winding so as to produce a field of flux influencing the remanence flux due to said stable states of magnetization and cause a voltage to be induced in said output winding.

3. A magnetic storage element adapted for non-destructive sensing of its residual history, comprising a magnetic circuit capable of assuming either one of two stable states of magnetization, means for producing an auxiliary flux circulation in a localized path within said circuit, means for varying said auxiliary flux, and further means comprising an output winding positioned transverse to and about a portion only of said magnetic circuit tangent to said localized path and in which a voltage is induced indicative of the residual history of said storage element.

4. A magnetic storage element adapted for non-destructive sensing, comprising a magnetic circuit capable of assuming either one of two states of magnetization, means for producing an interrogating flux in a localized path within said magnetic circuit, and an output winding positioned about a transverse portion of said magnetic circuit tangent to said localized path and in which a voltage is induced indicative of the residual history of said storage element.

5. A magnetic storage element comprising a closed magnetic circuit capable of assuming either one of two stable states of magnetization, at least one input winding positioned about said circuit, an output winding positioned about a transverse portion of said circuit through a first pair of spaced openings positioned within said magnetic circuit, and an interrogate coil wound through a further pair of openings so as to embrace only that portion of the circuit intermediate said first pair of openings.

References Cited in the file of this patent

UNITED STATES PATENTS

| | | |
|---|---|---|
| 2,284,406 | D'Entremont | May 26, 1942 |
| 2,741,757 | Devol et al. | Apr. 10, 1956 |